United States Patent
Bourgoin et al.

(10) Patent No.: US 8,800,637 B2
(45) Date of Patent: Aug. 12, 2014

(54) HEAT EXCHANGER INCLUDING AN AIR FLOW CONTROL VALVE

(75) Inventors: Guillaume Bourgoin, Paris (FR); Laurent Odillard, Le Luart (FR); Georges De Pelsemaeker, Poigny-la-Foret (FR); Carlos Martins, Le Chesnay (FR); Bertrand Gessier, Montfort-l'Amaury (FR); Stéphanie Moroz, Versailles (FR)

(73) Assignee: Valeo Systemes Thermiques, Le Mesnil Saint Denis, Cedex (FR)

( * ) Notice: Subject to any disclaimer, the term of this patent is extended or adjusted under 35 U.S.C. 154(b) by 1092 days.

(21) Appl. No.: 12/743,063

(22) PCT Filed: Nov. 6, 2008

(86) PCT No.: PCT/EP2008/065058
§ 371 (c)(1),
(2), (4) Date: Oct. 6, 2010

(87) PCT Pub. No.: WO2009/062879
PCT Pub. Date: May 22, 2009

(65) Prior Publication Data
US 2011/0017425 A1    Jan. 27, 2011

(30) Foreign Application Priority Data
Nov. 15, 2007   (FR) ...................... 07 08019

(51) Int. Cl.
*F01N 5/02*   (2006.01)
*F28F 27/00*   (2006.01)
*F28F 27/02*   (2006.01)
*F02B 33/00*   (2006.01)

(52) U.S. Cl.
USPC ............... 165/51; 165/96; 165/100; 165/103; 237/12.3 B; 123/563; 123/568.12; 123/568.17; 123/568.18

(58) Field of Classification Search
USPC ............ 165/51, 96, 100, 101, 102, 103, 280, 165/282, 283, 284, 297; 123/563, 564, 123/568.11, 568.12, 568.15, 568.17, 123/568.18, 568.19, 568.2, 568.26; 237/12.3 B
See application file for complete search history.

(56) References Cited

U.S. PATENT DOCUMENTS 2,076,287 A * 4/1937 Arnold ..................... 237/12.3 B
3,389,553 A * 6/1968 Hardy et al. .................... 417/28
(Continued)

FOREIGN PATENT DOCUMENTS

EP        0646702 A1    4/1995
EP        0940567 A2    9/1999
(Continued)

OTHER PUBLICATIONS

English language abstract for EP 0646702 extracted from espacenet.com database, dated Oct. 11, 2010, 12 pages.
(Continued)

*Primary Examiner* — Ljiljana Ciric
(74) *Attorney, Agent, or Firm* — Howard & Howard Attorneys PLLC

(57) ABSTRACT

A heat exchanger for the air supply circuit of a motor vehicle engine includes a heat exchange core and at least one header tank. The heat exchanger also includes an air flow rate control valve arranged in the header tank of the exchanger, and the control valve is a valve that includes a body with three openings and a moving rotary member inside the body so as to control the circulation of air through the heat exchange core and/or through a duct bypassing the heat exchange core according to a law defined as a function of the angular position of the rotary member in the body.

13 Claims, 2 Drawing Sheets

(56) References Cited

U.S. PATENT DOCUMENTS

| | | | | |
|---|---|---|---|---|
| 3,513,907 A * | 5/1970 | Hughes | ................ | 165/206 |
| 3,554,849 A * | 1/1971 | Hughes | ................ | 165/51 |
| 3,601,183 A * | 8/1971 | Lohner et al. | ................ | 165/103 |
| 3,712,282 A | 1/1973 | Isley | | |
| 3,877,514 A * | 4/1975 | Beck | ................ | 165/103 |
| 3,966,119 A * | 6/1976 | Harter et al. | ................ | 237/12.3 B |
| 4,156,408 A * | 5/1979 | Protze | ................ | 165/103 |
| 4,200,124 A * | 4/1980 | Stratynski et al. | ................ | 165/297 |
| 4,319,630 A * | 3/1982 | Hronek et al. | ................ | 165/297 |
| 4,361,170 A * | 11/1982 | Peloza | ................ | 165/284 |
| 4,385,496 A * | 5/1983 | Yamane | ................ | 123/563 |
| 4,426,965 A * | 1/1984 | Patel | ................ | 165/51 |
| 4,483,150 A * | 11/1984 | Melchior et al. | ................ | 60/599 |
| 4,513,729 A * | 4/1985 | Udd | ................ | 123/563 |
| 4,565,177 A * | 1/1986 | Roettgen et al. | ................ | 123/563 |
| 4,593,749 A * | 6/1986 | Schatz | ................ | 165/283 |
| 4,993,367 A * | 2/1991 | Kehrer | ................ | 165/101 |
| 5,152,144 A * | 10/1992 | Andrie | ................ | 165/51 |
| 5,452,686 A * | 9/1995 | Stahl | ................ | 165/101 |
| 5,546,975 A | 8/1996 | Pernet | | |
| 5,669,363 A * | 9/1997 | Francis | ................ | 123/563 |
| 5,911,212 A | 6/1999 | Benson | | |
| 5,950,715 A * | 9/1999 | Jonsson et al. | ................ | 165/103 |
| 6,052,995 A * | 4/2000 | Krimmer et al. | ................ | 123/564 |
| 6,141,961 A * | 11/2000 | Rinckel | ................ | 60/288 |
| 6,142,213 A * | 11/2000 | Gallivan et al. | ................ | 165/51 |
| 6,330,910 B1 | 12/2001 | Bennett | | |
| 6,604,514 B1 * | 8/2003 | Englund et al. | ................ | 123/559.1 |
| 6,758,193 B1 * | 7/2004 | Kincaid | ................ | 123/542 |
| 6,807,955 B2 * | 10/2004 | Leedham et al. | ................ | 123/568.12 |
| 6,883,320 B2 * | 4/2005 | Tyler | ................ | 123/564 |
| 6,971,377 B2 * | 12/2005 | Moyer et al. | ................ | 123/568.12 |
| 6,981,545 B2 * | 1/2006 | Damson et al. | ................ | 165/297 |
| 7,032,577 B2 * | 4/2006 | Rosin et al. | ................ | 123/568.12 |
| 7,036,565 B2 * | 5/2006 | Brost et al. | ................ | 165/103 |
| 7,055,584 B2 * | 6/2006 | Brost | ................ | 165/153 |
| 7,152,588 B2 * | 12/2006 | Corba | ................ | 123/563 |
| 7,168,419 B2 * | 1/2007 | Rosin et al. | ................ | 123/568.12 |
| 7,264,040 B2 * | 9/2007 | Bush et al. | ................ | 165/103 |
| 7,353,865 B2 * | 4/2008 | Speer | ................ | 165/284 |
| 7,412,945 B2 * | 8/2008 | Jekerle et al. | ................ | 165/101 |
| 7,584,782 B1 * | 9/2009 | Bizzarro | ................ | 165/101 |
| 7,621,128 B2 * | 11/2009 | Czarnowski et al. | ................ | 123/568.12 |
| 7,743,816 B2 * | 6/2010 | Mercz et al. | ................ | 165/297 |
| 7,823,624 B2 * | 11/2010 | Marche | ................ | 165/44 |
| 7,836,945 B2 * | 11/2010 | Speer | ................ | 165/284 |
| 7,845,338 B2 * | 12/2010 | Smith et al. | ................ | 123/568.12 |
| 8,074,628 B2 * | 12/2011 | Albert et al. | ................ | 123/563 |
| 8,225,849 B2 * | 7/2012 | Hendrix | ................ | 165/101 |
| 8,365,813 B2 * | 2/2013 | Mercz et al. | ................ | 165/100 |
| 2003/0111211 A1 * | 6/2003 | Stonehouse et al. | ................ | 165/103 |
| 2004/0206342 A1 * | 10/2004 | Moyer et al. | ................ | 123/568.12 |
| 2005/0039729 A1 * | 2/2005 | Rosin et al. | ................ | 123/568.12 |
| 2005/0081523 A1 * | 4/2005 | Breitling et al. | ................ | 123/563 |
| 2006/0032613 A1 * | 2/2006 | Brost et al. | ................ | 165/103 |
| 2006/0124114 A1 * | 6/2006 | Sayers et al. | ................ | 123/568.12 |
| 2006/0162706 A1 * | 7/2006 | Rosin et al. | ................ | 123/568.12 |
| 2007/0157983 A1 * | 7/2007 | Beck et al. | ................ | 137/875 |
| 2007/0158059 A1 * | 7/2007 | Pineo et al. | ................ | 165/297 |
| 2007/0240850 A1 * | 10/2007 | Han | ................ | 165/101 |
| 2009/0090495 A1 * | 4/2009 | Domes et al. | ................ | 165/165 |

FOREIGN PATENT DOCUMENTS

| | | | | |
|---|---|---|---|---|
| JP | 62-46194 A | | 2/1987 | |
| WO | WO 2005033489 A1 * | | 4/2005 | ............ F02B 29/04 |

OTHER PUBLICATIONS

English language abstract for EP 0940567 extracted from espacenet.com database, dated Oct. 11, 2010, 7 pages.
English language abstract for JP 62046194 extracted from espacenet.com database, dated Oct. 11, 2010, 4 pages.
PCT International Search Report for PCT/EP2008/065058, dated Aug. 25, 2009, 3 pages.

* cited by examiner

HEAT EXCHANGER INCLUDING AN AIR FLOW CONTROL VALVE

RELATED APPLICATIONS

This application claims priority to and all the advantages of International Patent Application No. PCT/EP2008/065058, filed on Nov. 6, 2008, which claims priority to French Patent Application No. FR 07/08019, filed on Nov. 15, 2007.

The present invention relates to a heat exchanger for the air supply circuit of a motor vehicle engine.

The invention applies to the general field of air supply for motor vehicle engines, and more particularly to engines in which the air supply originates from a compressor or a turbocompressor, in which case the term "charge air" is used.

Hereinafter, the expressions "supply air" and "charge air" will be understood to mean both the air originating from just the single engine induction system and a mixture of air and exhaust gas recovered at the engine outlet, in accordance with the system generally known by the acronym EGR (exhaust gas recirculation).

In order to increase the density of the induction air of an engine equipped with turbocompressor, it is known practice to cool the charge air leaving the compressor by means of a heat exchanger which is also called charge air cooler, abbreviated RAS.

Charge air coolers that use engine coolant such as glycol water for the heat transfer fluid are known.

A charge air cooler that can be used in the context of the invention comprises at least one heat exchange core. This heat exchange core may comprise parallel tubes or a stack of plates alternately forming circulation canals for the supercharged air to be cooled and canals for the circulation of the engine coolant.

Such a cooler can also be used in an air supply circuit of a motor vehicle engine. One known circuit comprises a first branch, called cooling branch, and a second branch, called bypass branch. The cooling branch comprises a charge air cooler and the second branch comprises a cooler bypass duct. The bypass branch allows the charge air to avoid passing through the cooler and therefore being cooled therein.

During the warm-up phase during which the engine is not yet sufficiently hot, there is no need to cool the charge air by letting it pass through the charge air cooler. Thus, all the charge air is directed to the bypass branch. There is therefore no circulation of charge air in the cooling branch and therefore in the charge air cooler.

On the other hand, when the engine temperature has reached a predetermined value, all the charge air is directed into the exchange branch and is cooled in the charge air cooler. In such a case, there is no circulation of charge air in the bypass branch.

In order in particular to implement the various functions mentioned hereinabove, the known air supply circuits comprise, on each branch (cooling and bypass) actuators which are usually valves, the often complex technology of which results in a significant additional manufacturing cost and makes management by the vehicle's electronic engine control systems difficult.

Also, these actuators are bulky and heavy, which is detrimental in terms of the volume occupied by the supply circuit in the engine, and also in terms of weight.

Finally, the installation of the actuators on the various branches of the circuit requires a relatively lengthy assembly time because the sealing at the joins between the actuators and the ducts of the branches to which they are connected must be perfect.

Thus, one aim of the present invention is to propose a heat exchanger for an air supply circuit of a motor vehicle engine, comprising a heat exchange core and at least one header tank, which would make it possible to obtain an exchanger architecture that is simpler, less bulky and less costly than the known heat exchangers.

This aim is achieved, according to the invention, by the fact that the heat exchanger comprises an air flow rate control valve arranged in the header tank of the exchanger. The control valve is a valve comprising a body with three openings and a single moving rotary member inside the body so as to control the circulation of air through the exchange core and/or a duct bypassing the core according to a law defined as a function of the angular position of the rotary member in the body.

Thus, an engine air supply circuit comprising a heat exchanger according to the invention has just one control valve whereas the known circuits require at least one valve for each cooling or bypass branch. The result of this is a reduced manufacturing cost and easier assembly. Furthermore, since the control valve is incorporated in a header tank of the cooler, the volume occupied by the "exchanger-valve" assembly is roughly equal to or just a little greater than the volume of the cooler itself.

In this embodiment, the control valve is a valve of the "three way" type with flow rates adjusted by a plug which is advantageously used to regulate the charge air flow rate not only in the cooling branch but also in the bypass branch. A fine adjustment of the charge air temperature and flow rate can then be obtained, whereas, in the known air supply circuits, the valve used for the bypass circuit can assume only two positions, namely open or closed.

According to one embodiment, the exchanger also comprises a duct bypassing the core.

Regarding the header tank, the invention proposes two embodiments: one in which said header tank is an outlet header tank of the supply air cooler, and the other in which said header tank is an inlet header tank of the supply air cooler.

In this last embodiment, the invention provides for the exchanger to also comprise a second header tank, called outlet tank, of the exchanger. In a particular embodiment, the outlet tank at least partly forms a housing intended to receive the heat exchange core.

According to a variant of the invention, the bypass duct is incorporated in the housing and opens out through an opening provided in a wall of the housing.

A heat exchanger is thus obtained that has a very compact architecture in which the exchanger and the bypass duct are placed in one and the same housing, this architecture possibly being complemented by the fact that said inlet header tank provided with the control valve forms a cover for said housing. In particular, said inlet header tank is welded to said outlet tank.

According to one embodiment, the outlet tank is an induction air distributor for the engine allowing communication, via orifices, with at least some of the induction ducts of the engine cylinder heads.

Finally, inlet and outlet manifolds for the coolant in the heat exchange core can also be taken into account in producing this compact architecture. To this end, provision is made for said manifolds to be arranged inside the housing.

The following description with regard to the appended drawings, given by way of nonlimiting examples, will give a clear understanding of what the invention consists of and how it can be implemented.

FIGS. 1a and 1b show, in perspective and in two different views, namely, respectively, an "assembled" view and an exploded view without heat exchange core, a heat exchanger 10 for the air supply circuit of a motor vehicle engine.

Figure 1A:
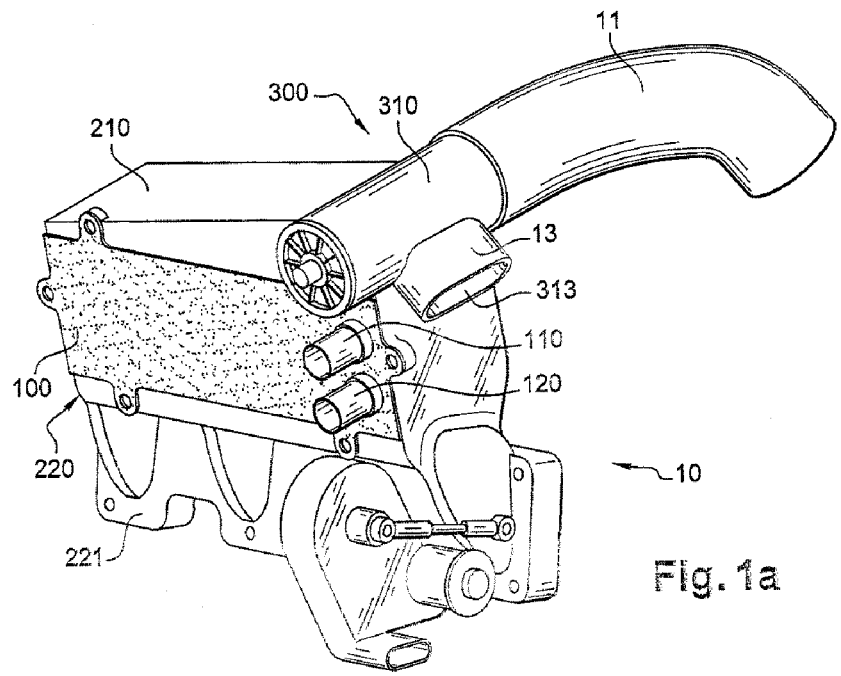
FIG. 1a is a first perspective view of a first embodiment of a heat exchanger according to the invention.

This heat exchanger 10 is more particularly intended to supply the engine with charge air, originating from a compressor or a turbocompressor arranged on the induction line, which is cooled. As FIG. 1a shows, the charge air is brought to the exchanger 10 via an air inlet duct 11.

In order to cool the charge air before it is introduced into the engine cylinders, the heat exchanger 10 comprises a heat exchange core 100 through which the charge air must pass in order to be cooled. The heat exchanger also comprises an inlet header tank 210 which, here, communicates with the air inlet duct 11 and an outlet tank 220. In this example, the outlet tank 220 is responsible for distributing the charge air, cooled after its passage through the heat exchange core 100, between the engine cylinders through the induction ducts, of which in this case there are four, of an induction distributor 221.

In other words, the outlet tank 220 is in this case produced in the form of an induction air distributor for the engine enabling communication, via orifices, with at least some of the induction ducts of the engine cylinder heads.

Figure 1B:
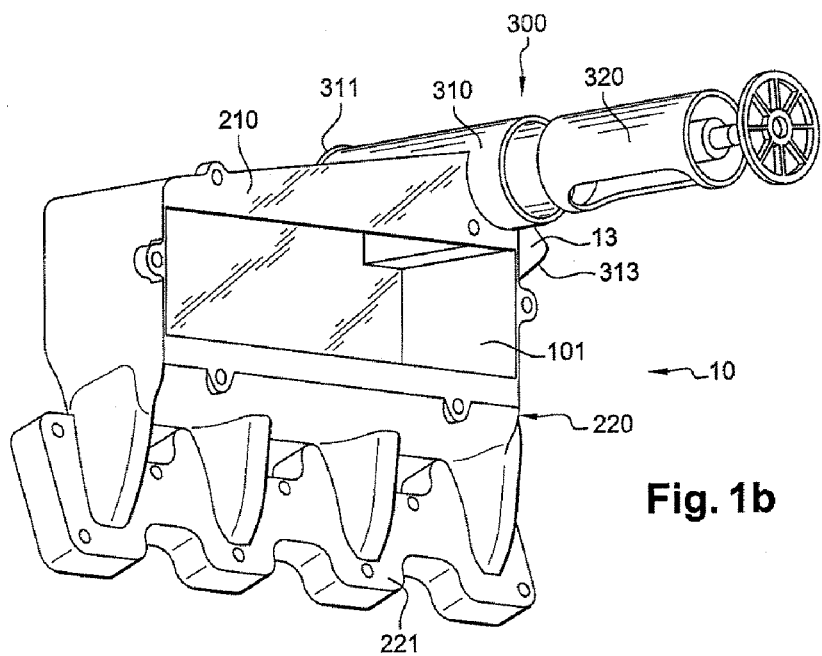
FIG. 1b is a exploded second perspective view of the heat exchanger of FIG. 1a without the heat exchange core.

FIG. 1a shows the heat exchange core 100 in place in the exchanger 10 while, in FIG. 1b, only the receptacle 101 for the heat exchange core 100 is represented. In other words, in FIG. 1b, the heat exchanger according to the invention is represented without its heat exchange core.

The heat exchange core 100 may take the form either of a set of parallel tubes or of a stack of plates.

In the embodiment example represented here, the heat exchange core is formed by a stack of plates forming alternately circulation canals for the charge air to be cooled and canals for the circulation of the heat transfer fluid, in this case the engine coolant.

Thus, as FIG. 1a shows, the coolant enters into the heat exchange core 100 via a heat exchange core coolant inlet manifold 120 and leaves therefrom via a heat exchange core coolant outlet manifold 110.

As represented in FIGS. 1a and 1b, a supply air flow rate control valve 300 is arranged inside the inlet header tank 210. This control valve 300 is of the "three way" type comprising a body 310 provided with three openings, namely a charge air inlet opening 311 connected to the inlet duct 11, a charge air outlet opening, not represented, to the heat exchange core 100, and a charge air outlet opening 313 to a duct 13 bypassing the heat exchange core 100, partially represented, allowing at least some of the charge air to short-circuit the heat exchange core 100.

Thus, the charge air arriving, in this case, via the duct 11, enters into the exchanger by passing through the air flow rate control valve 300. The control valve then distributes the flow of air in the heat exchange core 100 and/or in the bypass duct 13. In other words, the header tank is provided with an inlet orifice communicating with the air intake of the control valve 300, in this case the inlet opening 311.

The body of the valve is, in this case, formed as an integral part of the inlet header tank. In other words, a seat for a rotary member of the valve is provided in the header tank. This seat forms the valve body and includes the abovementioned three openings.

The charge air flow is divided up between the header tank 210 and the circuit 13 bypassing the core by the fact that the valve 300 also comprises a single rotary member 320, or plug, that can move inside the body 310 so as to control the circulation of the air through the heat exchange core 100 and/or through the bypass duct 13 according to a law defined as a function of the angular position of the rotary member 320 in the body 310. The law governing the circulation of the charge air through each of the outlet openings is thus a progressive law and not an all-or-nothing binary law.

It will be recalled that the object of this advantageous arrangement is to finely adjust the flow rate and the temperature of the charge air entering into the engine via the induction distributor 221 according to the phases in the life of the engine.

In particular, in the cold start phase, the outlet opening 313 to the bypass duct 13 is open whereas the outlet opening to the heat exchange core 100 is completely closed.

The simultaneous closure of both openings chokes the engine.

Finally, the outlet openings can each be controlled according to a progressive law in order to obtain the requisite supply air temperature and flow rate according to the power required.

Figure 2A:
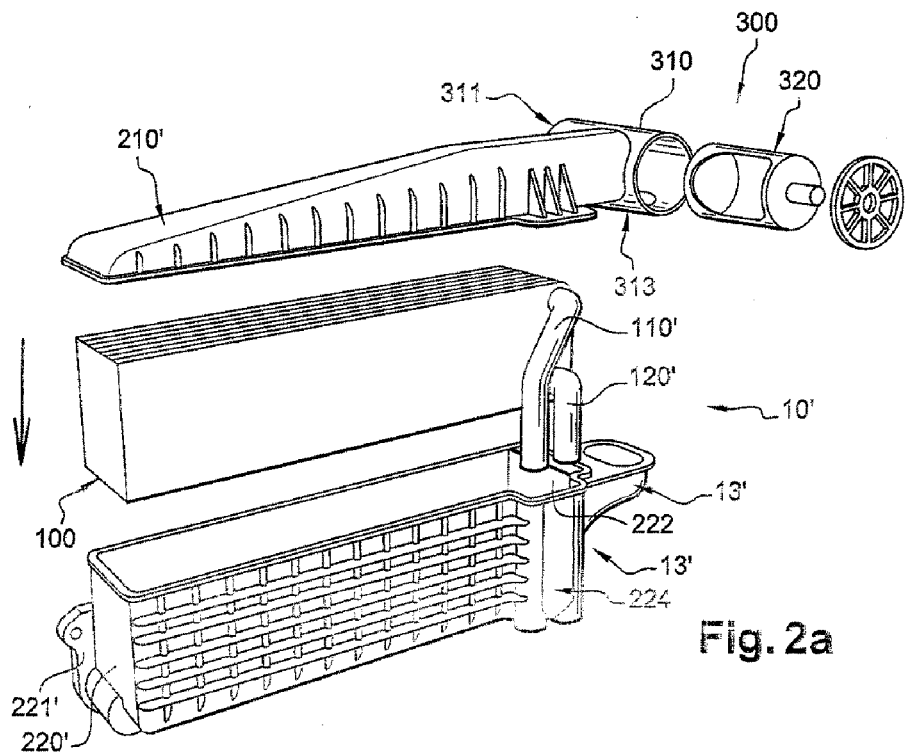
FIG. 2a is an exploded perspective view of a second embodiment of a heat exchanger according to the invention.
Figure 2B:
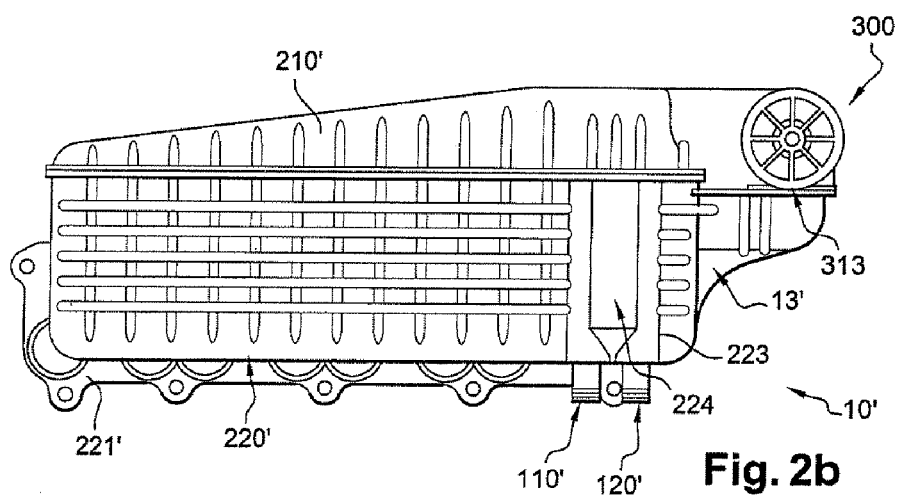
FIG. 2b is a side view of the heat exchanger of FIG. 2a, this exchanger being assembled.

FIGS. 2a and 2b relate to a particular embodiment of a heat exchanger 10' of the same type as the heat exchanger 10 illustrated in FIGS. 1a and 1b.

It can be seen in FIGS. 2a and 2b that the outlet tank 220', in this case also produced in the form of an induction distributor 221', at least partly forms a housing intended to receive the heat exchange core 100. In this embodiment, all of the core is introduced into the housing. The core is introduced parallel to the direction of circulation of the supply air, represented in the figures by the vertical arrows.

In this embodiment, the bypass duct 13' is incorporated in the housing 220' and opens out through an opening 223 provided in a wall 222 of the housing. The duct 13' extends between the outlet opening 313 of the control valve 300 and the opening 223 roughly parallel to the direction of the circulation of the charge air in the heat exchange core 100. In this case, the circulation of the charge air in the heat exchange core takes place, in FIGS. 2a and 2b, from top to bottom.

The duct 13' opens out at the same level as the outlet of the heat exchange core, that is to say at the level of the orifices allowing communication with the induction ducts of the engine cylinder heads.

The housing 220' forming the outlet tank and including the bypass duct 13' may be completely closed by means of the inlet header tank 210', as which can be seen in FIG. 2b, receives the charge air from the opening 312 of the body 310 of the control valve 300. Also in this case, the body 310 of the valve is incorporated in said header tank 210'. In other words, the body 310 is formed as an integral part of the header tank 210'.

FIG. 2a also shows that the inlet and outlet manifolds 120', 110' for circulation of the engine coolant in the core are arranged parallel to the direction of circulation of the supply air in the cooler. This allows the heat exchange core to be inserted into the housing. It is also possible to consider fully incorporating the manifolds 110', 120' inside the housing 220', in a protrusion-forming seat 224 provided on a wall of the housing 220'.

Obviously, the manifolds 110', 120' could be arranged on either side of the cooler 100, and not both on the same side.

After having introduced the heat exchange core 100 into the housing 220', the cover 210' is put in place on the housing to be welded thereto. A heat exchanger 10' is then obtained which is very compact and leak-tight and which incorporates, in a single-piece form, all the functions required for the appropriate treatment of the supply air according to the phases in the life of the engine, as explained above.

Finally, it should also be noted that, while the invention has been described by taking the inlet tank of the heat exchanger to be the header tank, this is no way limiting since it is perfectly possible to implement the teachings of the invention by incorporating the control valve in the outlet header tank of the heat exchanger. All that is required for that is to reverse the position of the valve relative to the direction of circulation of the supply air.

The invention claimed is:

1. A heat exchanger (10; 10') for an air supply circuit of a motor vehicle engine, said heat exchanger (10; 10') comprising a heat exchange core (100) and at least one header tank (210; 210'), said heat exchanger (10; 10') includes an air flow rate control valve (300) arranged in said at least one header tank (210; 210') of said heat exchanger (10; 10'), said air flow rate control valve (300) is a valve comprising a body (310) with a plurality of openings (311, 313) and a moving rotary member (320) configured to rotate inside said body (310) so as to control the circulation of air through said heat exchange core (100) and/or through a duct (13; 13') bypassing said heat exchange core (100), wherein said air flow rate control valve is configured to control the circulation of the air as a function of the angular position of said rotary member (320) in said body (310), wherein said body (310) is formed as an integral part of said at least one header tank (210, 210').

2. The heat exchanger (10; 10') as claimed in claim 1, further comprising a duct (13; 13') bypassing said heat exchange core (100).

3. The heat exchanger (10; 10') as claimed in claim 2, in which said at least one header tank (210; 210') is an outlet header tank of said heat exchanger (10; 10').

4. The heat exchanger (10; 10') as claimed in claim 2, in which said at least one header tank (210; 210') is an inlet header tank (210; 210') of said heat exchanger (10; 10').

5. The heat exchanger (10; 10') as claimed in claim 1, in which said at least one header tank (210; 210') is an outlet header tank of said heat exchanger (10; 10').

6. The heat exchanger (10; 10') as claimed in claim 1, in which said at least one header tank (210; 210') is an inlet header tank (210; 210') of said heat exchanger (10; 10').

7. The heat exchanger (10; 10') as claimed in claim 6, wherein said at least one header tank includes a second header tank (220; 220') of said heat exchanger (10; 10').

8. The heat exchanger (10; 10') as claimed in claim 7, in which said second header tank (220) at least partly forms a housing (220') intended to receive said heat exchange core (100).

9. The heat exchanger (10; 10') as claimed in claim 8, in which said bypass duct (13') is incorporated in said housing (220') and opens out through an opening (223) provided in a wall (222) of said housing (220').

10. The heat exchanger (10; 10') as claimed in claim 8, in which said inlet header tank (210') provided with said control valve (300) forms a cover for said housing (220').

11. The heat exchanger (10; 10') as claimed in claim 10, in which said inlet header tank (210') is welded to said second header tank (220).

12. The heat exchanger (10; 10') as claimed in claim 8, in which said second header tank (220,) is an induction air distributor for the engine.

13. The heat exchanger (10; 10') as claimed in claim 12, in which an inlet and an outlet manifold (110', 120') for a coolant in said heat exchange core (100) are arranged inside said housing (220').

* * * * *